United States Patent [19]

Baker et al.

[11] Patent Number: 5,669,961
[45] Date of Patent: Sep. 23, 1997

[54] METHOD FOR THE PURIFICATION OF NOBLE GASES, NITROGEN AND HYDROGEN

[75] Inventors: John D. Baker, Blackfoot; David H. Meikrantz, Idaho Falls, both of Id.; Dale G. Tuggle, Los Alamos, N. Mex.

[73] Assignee: Lockheed Martin Idaho Technologies Company, Idaho Falls, Id.

[21] Appl. No.: 337,574

[22] Filed: Nov. 10, 1994

Related U.S. Application Data

[63] Continuation of Ser. No. 88,941, Jul. 12, 1993, abandoned.

[51] Int. Cl.[6] .................................................... B01D 53/04
[52] U.S. Cl. ........................... 95/115; 95/121; 95/127; 95/128; 95/138; 95/139; 95/140; 95/143; 95/900; 96/112; 96/127; 96/133; 96/143
[58] Field of Search .................... 95/115, 117, 121, 95/127, 128, 138–140, 143, 146, 900; 96/109, 112, 121, 126, 127, 133, 143; 156/DIG. 66; 252/181.1, 181.4, 181.6, 181.7; 445/55

[56] References Cited

U.S. PATENT DOCUMENTS

| | | | |
|---|---|---|---|
| 4,071,335 | 1/1978 | Barosi | 95/138 |
| 4,312,669 | 1/1982 | Boffito et al. | 95/117 X |
| 4,405,487 | 9/1983 | Harrah et al. | 252/181.7 X |
| 4,717,551 | 1/1988 | Bernauer et al. | 95/117 X |
| 4,867,762 | 9/1989 | Pierini et al. | 95/139 X |
| 5,180,568 | 1/1993 | Boffito et al. | 423/492 |
| 5,238,469 | 8/1993 | Briesacher et al. | 95/115 |

FOREIGN PATENT DOCUMENTS

| | | | |
|---|---|---|---|
| 0475312 | 3/1992 | European Pat. Off. | 95/117 |
| 2161347 | 7/1973 | France | 95/138 |
| 2177079 | 1/1987 | United Kingdom | 95/117 |
| 2234451 | 2/1991 | United Kingdom | 95/127 |

Primary Examiner—Robert Spitzer
Attorney, Agent, or Firm—Alan D. Kirsch

[57] ABSTRACT

A method and apparatus for the purification and collection of hydrogen isotopes in a flowing inert gaseous mixture containing impurities, wherein metal alloy getters having the capability of sorbing non-hydrogen impurities such as oxygen, carbon dioxide, carbon monoxide, methane, ammonia, nitrogen and water vapor are utilized to purify the gaseous mixture of impurities. After purification hydrogen isotopes may be more efficiently collected. A plurality of parallel process lines utilizing metal getter alloys can be used to provide for the continuous purification and collection of the hydrogen isotopes.

35 Claims, 15 Drawing Sheets

025 # METHOD FOR THE PURIFICATION OF NOBLE GASES, NITROGEN AND HYDROGEN

CROSS-REFERENCE TO RELATED APPLICATIONS

This is a continuation of application Ser. No. 08/088,941, filed Jul. 12, 1993, now abandoned.

CONTRACTUAL ORIGIN OF THE INVENTION

The United States Government has rights in this invention pursuant to Contract No. DE-AC07-76ID01570 between the U.S. Department of Energy and EG&G Idaho, Inc., now Contract No. DE-AC07-94ID13223 between the U.S. Department of Energy and Lockeed Idaho Technologies Company. This invention is also the result of work performed under U.S. Department of Energy Contract No. W-7405-ENG-36.

BACKGROUND OF THE INVENTION

This invention relates to a process for removing hydrogen isotopes from a flowing gaseous stream and more particularly to a process for purifying the hydrogen or tritium from such reactive gaseous impurities as oxygen, carbon dioxide, carbon monoxide, methane, nitrogen, and water.

Numerous metals and metal alloys have been evaluated for the sorption of hydrogen isotopes with much focus on tritium in particular. R. D. Penzhorn, M. Devillers and M. Sirch, J. Nucl. Mater., 170, 217 (1990). This technology has wide application in such areas as nuclear fusion, hydrogen isotope chemical compression, and tritium handling, purification and storage. Uranium beds have been thoroughly studied and are widely employed as metal tritide interim storage devices. However, due to the high chemical reactivity and restrictive use of nuclear materials, alternative getters such as vanadium, lanthanum, yttrium, titanium and zirconium in pure and alloy forms are of interest.

Both titanium and zirconium-cobalt alloys have been found to be useful for long term and interim tritium storage. E. Willin, M. Sirch, R. D. Penzhorn and M. Devillers, Fusion Technol., 14, 756 (1988). A clean-up system for tritiated glove box applications based upon St 707 (Tradename of SAES Getters S.p.a., Milano, Italy) an alloy comprised of Zr (70%), V (24.6%), and Fe (5.4%), was demonstrated for effective tritium removal at low temperatures. B. Bonizzoni, F. Ghezzi, M. Nassi, and M. Succi, J. Vac. Sci. Technol., A8, 961 (1988). Getters have also been evaluated as tritium compressors. Alloys of Zr—V—Fe have been evaluated versus uranium and found to exhibit fast tritium sorption kinetics and improved safety characteristics. F. Doni, C. Boffito, and B. Ferrairo, J. Vac. Sci. Technol. A4, 2447 (1986); W. T. Shmayda, N. P. Kherani, F. M. Ghezzi, and G. Bonizzoni, Fusion Technol. 21, 1024 (1992).

Independent of which metal alloy is employed for collection and storage of tritium, the subject of reactive impurities is important. The most important impurities found in various tritium systems are $C_xQ_y$, $CQ_4$, $CO$, $CO_2$, $N_2$, $O_2$, $NQ_3$, and $Q_2O$ (where x and y are integers, and Q represents hydrogen, deuterium or tritium). All of the candidate metals and metal alloys irreversibly retain some part of the reaction products of these gaseous impurities. Therefore, the tritium collection getters, if exposed to an impure gaseous flow, will eventually lose performance. Both tritium sorption kinetics and capacity of the getter are degraded as the carbon, nitrogen and oxygen content increases in the getter. Therefore it is desirable to first purify the flowing stream prior to tritium collection.

Fusion researchers at Karlsruhe Nuclear Research Center have evaluated uranium getters in a three-phase process to remove reactive impurities. U. Tamm, E. Hutter, G. Neffe, and P. Schira, Fusion Technol. 21, 983 (1992). In this study, the removal of $O_2$, $N_2$, and C were demonstrated by sequential beds of uranium heated to 500° C., 700° C., and 900° C., respectively. Generally efficient removal was achieved except for $CH_4$ which requires 900° C. temperatures for efficient cracking. At this temperature, the uranium powder becomes sintered which reduces the effective getter surface area of the bed.

Currently the standard engineering flow diagram for the removal of impurities from an inert gas stream and collection of tritium is conducted in a five step process. In the first step of the conventional tritium collection process, the extracted offgas enters a catalytic water/gas shift reactor which converts water (i.e., $H_2O$, HTO or $T_2O$) to CO, $CO_2$ and $H_2$, HT. Next the $H_2O$, molecular sieve adsorber sorbs the unreacted water and CO and the $CO_2$ molecular sieve adsorber sorbs the $CO_2$. The hydrocarbon catalytic cracker then breaks down hydrocarbons (e.g., methane) to elemental form, generally $H_2$, $T_2$, HT and C. Finally, an activated carbon adsorber sorbs the unreacted hydrocarbon. After this five step process, conventional metal getters such as those described in U.S. Pat. No. 5,080,693 of Bourne et al. and U.S. Pat. No. 5,238,469 of Breisacher et al. collect, through sorption, the remaining $H_2$ or HT which may then be stored for future desorption. However, a limitation experienced by conventional metal getter process, such as described in Bourne et al. and Briesacher et al., is created by loading the getters material with high levels of impurities thereby decreasing the efficiency in hydrogen isotope removal from the gaseous stream. Also, the conventional getter process such as described in Briesacher et al. are capable of only removing trace amounts of impurities, typically on the order of 0.1 to 10 parts per million.

It is an object of this invention to provide a simple and economically efficient process of purifying a flowing gaseous stream prior to collection of the hydrogen isotope.

It is another object of this invention to provide a process of removing reactive impurities from a flowing gas stream such as $C_xQ_y$, $CQ_4$, CO, $CO_2$, $O_2$, $N_2$, $NQ_3$, and $Q_2O$ (where x and y are integers, and Q represents hydrogen, deuterium or tritium) found in various tritium systems.

It is another object of this invention to provide a method of purifying a gaseous stream of reactive impurities and collecting the hydrogen isotope from the purified stream.

It is still another object of this invention to provide a method of purifying a gaseous stream of relatively high concentrations of reactive impurities, typically in excess of 100 parts per million.

It is still a further object of this invention to provide a process for employing getter alloys to purify the hydrogen, nitrogen, or noble gases from such reactive gaseous impurities as carbon dioxide, carbon monoxide, methane, oxygen, nitrogen, and water.

It is still a further object of this invention to dissociate methane into its elemental components by employing getter alloys.

Additional objects, advantages and novel features of the invention will become apparent to those skilled in the art upon examination of the following and by practice of the invention.

SUMMARY OF THE INVENTION

To achieve the foregoing and other objects the present invention utilizies metal getters having the ability to remove impurities such as methane, ammonia, carbon monoxide, carbon dioxide, water, and oxygen from a gaseous mixture. In a preferred embodiment of the present invention a continous process for the purification and collection of hydrogen isotopes is provided through the use of parallel process lines. The purification of the gaseous mixture takes place in housings containing metal alloy getters, such as St 909, which have the capability to sorb reactive non-hydrogen impurities from the gaseous mixture. By controlling the getter temperature and the residence time of the gaseous mixture within the getters casing, high impurity removal efficiencies can be achieved.

In another embodiment of the invention, hydrogen isotopes can be collected from the remaining purified gaseous mixture using conventional hydrogen isotope collection means, such as metal alloy getters or uranium beds. Purification of impurities from the gaseous mixture prior to the hydrogen isotopic collection results in prolonging the collection getter efficiency and is otherwise more economical. In still another embodiment of the present invention, a secondary collection step can be included in the process. This secondary collection step provides an additional benefit in the event of excessively loading the primary collection getters. Upon loading, the primary collection getter can be taken off line and the secondary collection getter is then primary, in which case a new secondary collection getter can be brought on line. After purification and collection of hydrogen isotopes, the remaining purified gas flows can be recycled or used for an alternate purpose.

BRIEF DESCRIPTION OF THE DRAWINGS

The present invention is illustrated in the accompanying drawings where.

DETAILED DESCRIPTION OF THE INVENTION

In experimental studies conducted by Applicants, a test gas flow path was constructed of stainless steel components. The getter furnace temperature was monitored and controlled by a type K thermocouple. The getter cartridge consisted of a stainless steel cylinder which was loosely filled with 100 grams of St 909 pills. The pressed powder St 909 pills are 6 mm in diameter and 4 mm in height and are an alloy consisting of 40.5 wt. % Zr, 24.5 wt. % Mn, 25 wt % Fe and 10 wt % Al. The test gasses used were all certified to contain the specified impurity within ±10% of the stated concentration in high purity inert gas diluent.

Analysis of the gaseous impurities was performed on a quadrupole mass spectrometer capable of single unit mass resolution. Each gas mixture was analyzed directly by bypassing the getter flow path to establish the initial impurity concentration. Flow control was supplied by mass flow controllers calibrated by standard soap bubble flow measurement techniques for each gas mixture. The estimated accuracy of flow rates stated is ±5% over the range of experimental conditions and long durations studied. The favorable kinetics observed for cracking and retention of reactive impurities on St 909 makes the effect of small flow changes negligible. No effort was made to control the ambient temperature of the gas mixtures used to test getter performance.

Inert gas containing the desired impurity was flowed through the St 909 getter cartridge under various conditions. The impurities were cracked to elemental form by catalytic interaction with the metal alloy surface. The St 909 alloy also has the desirable trait of adsorbing very little hydrogen or isotopes of hydrogen. Thus when methane was cracked, the carbon was retained on the St 909 getter alloy while the liberated hydrogen passed through. In the case of oxygenated gaseous impurities such as carbon monoxide, the oxygen reacted irreversibly with the metal alloy to form metal oxides and the carbon was retained as well. A summary of the cracking efficiency of St 909 for several impurities at various temperatures is shown in the following Table 1:

TABLE 1

Reaction of $NH_3$, CO, $CO_2$, $O_2$, and $CH_4$ with St 909 at several temperatures. (100 grams of St 909, flow rate of 100 sccm, each impurity tested separately).

| Impurity | Concentration % in Helium | Temperature °C. | % Cracked |
| --- | --- | --- | --- |
| $NH_3$ | 1.0 | 400 | >99.9 |
| CO* | 0.1 | 600 | >99.9 |
| $CO_2$ | 1.0 | 400 | >99.9 |
| $O_2$ | 1.0 | 400 | >99.9 |
| $CH_4$ | 0.1 | 600 | 98.0 |
| $CH_4$ | 0.1 | 700 | >99.9 |
| $CH_4$ | 1.0 | 600 | 93.0 |
| $CH_4$ | 1.0 | 700 | 99.9 |

*CO studied in argon at temperatures greater than 600° C.

Experimental Studies

Figure 1:
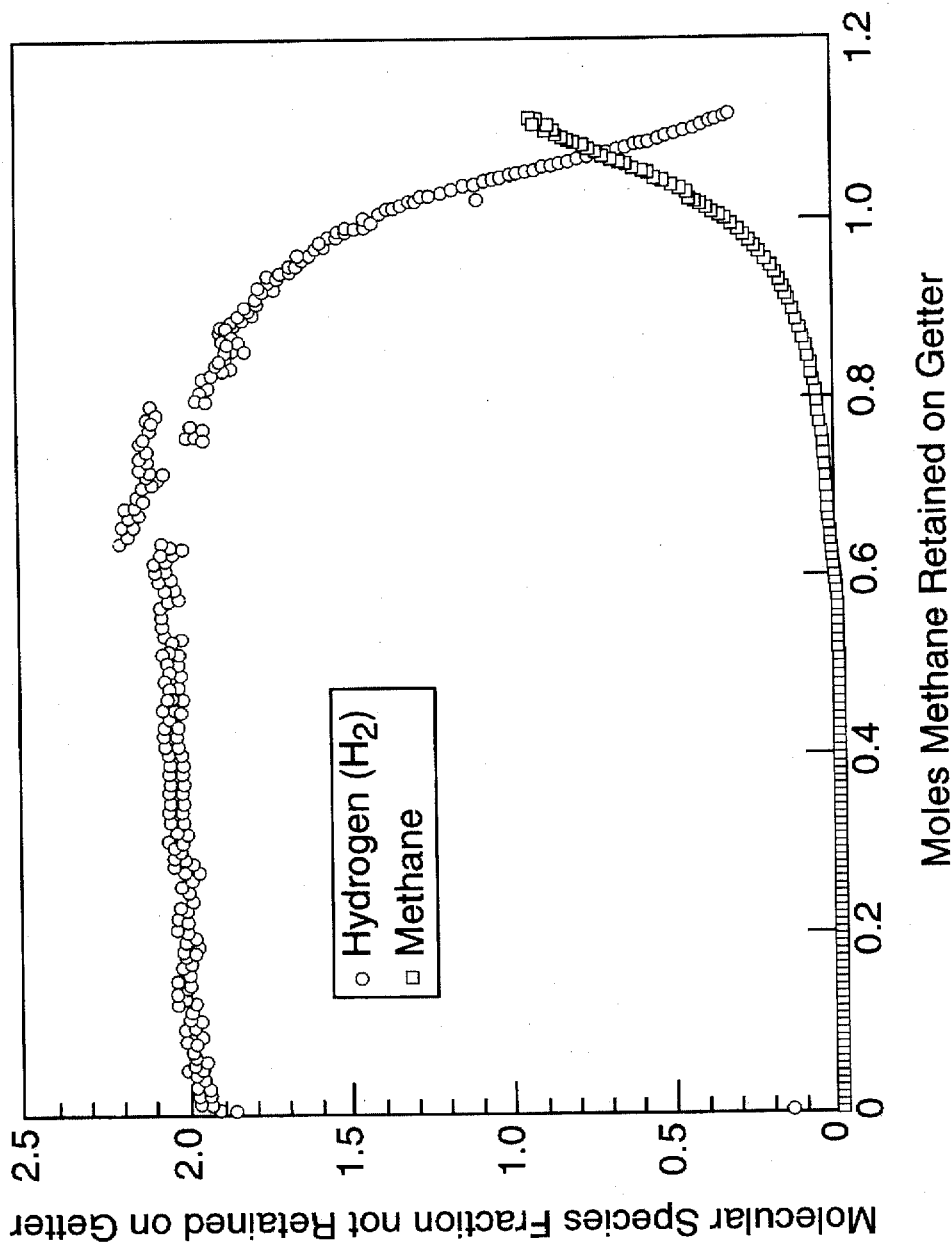
FIG. 1 is a graph showing the fraction of methane cracked by the St 909 getter as a function of total getter carbon loading.

Experimental studies were conducted in which helium, with 1.1% methane, flowed through a cartridge containing 100 grams of St 909 pills. The getter cartridge was heated to a constant temperature of 800° C. by a resistance furnace. The gas flow rate was 100 standard cubic centimeters per minute (sccm). The outlet gas stream from the St 909 getter was monitored for hydrogen and methane by the quadrupole gas analyzer. The results of this experiment are shown in FIG. 1. The fraction of methane cracked gradually decreased as the total getter carbon loading increased. This experiment graphically illustrates the behavior of the resultant hydrogen from methane cracking. The molecular species fraction of $H_2$ not retained on the getter climbed rapidly and approached the theoretical value of 2. The later $H_2$ species fraction decrease followed the drop in methane cracking efficiency as loading of the getter progressed.

Figure 2:
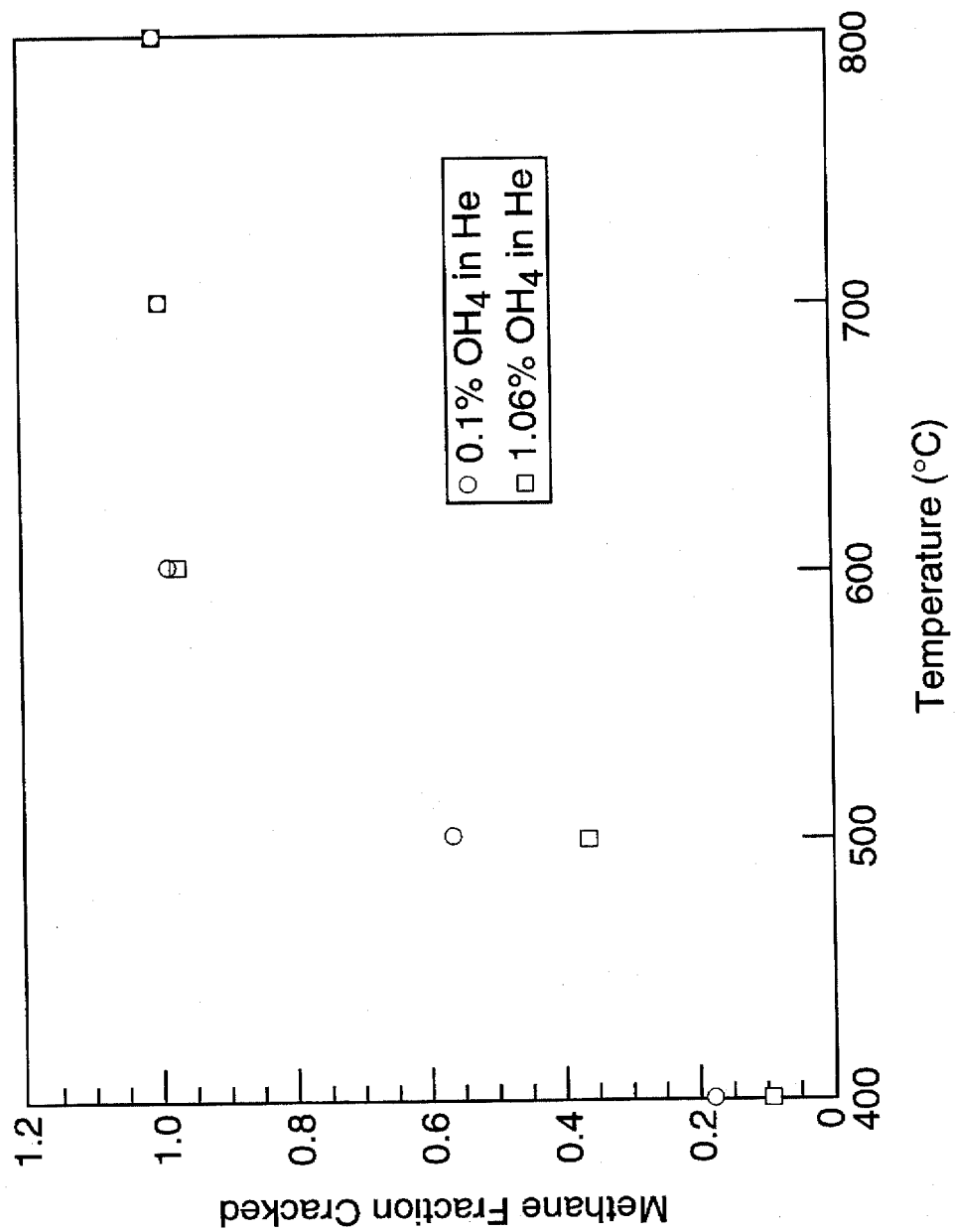
FIG. 2 is a graph showing the fraction of methane cracked by the St 909 getter as a function of the gas stream temperature.
Figure 3:
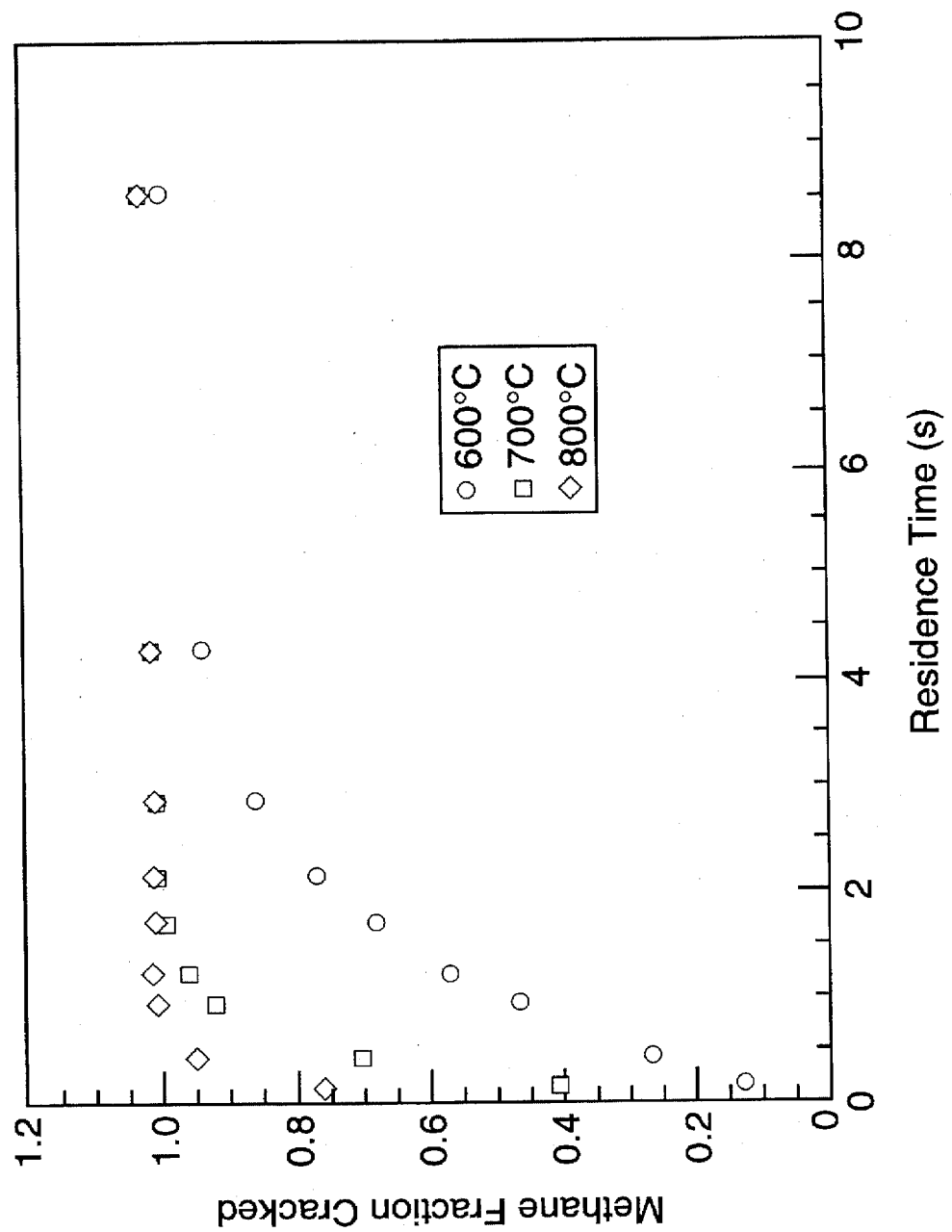
FIG. 3 is a graph showing the fraction of methane cracked by the St 909 getter as a function of getter temperature and residence time in the getter casing.
Figure 4:
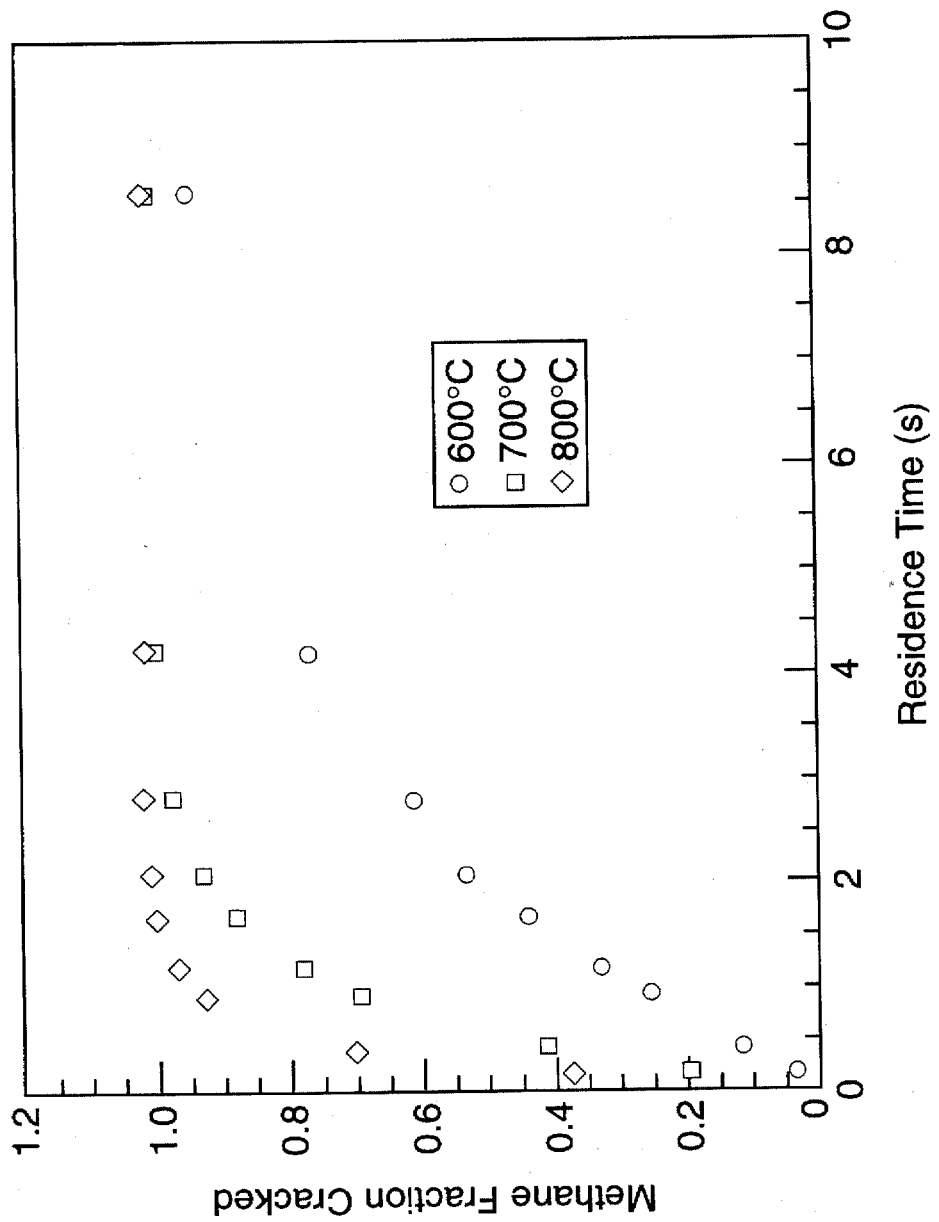
FIG. 4 is a graph showing the fraction of methane cracked by the St 909 getter as a function of getter temperature and residence time in the getter casing.

Another methane experiment was performed to study the relationship between methane cracking efficiency and getter temperature. Two different concentrations of methane in helium were used and the flow rate was set at 100 sccm. Again, a 100 gram St 909 getter cartridge was used to reduce long-term loading effects on the getter cracking efficiency. The results of this experiment are shown in FIG. 2 where it can be seen that the methane fraction cracked at temperatures of 400° C. and 500° C. was somewhat dependent upon the initial methane concentration. However, at temperatures greater than or equal to 600° C., the cracking efficiency at both concentrations is 100%. Since this operating temperature range is established for methane, the most difficult contaminant gaseous specie to crack, it is apparent that this temperature range is also suitable for other species such as $CO$, $CO_2$, $NH_3$ and $H_2O$. A series of tests have shown that $CO_2$, $O_2$ and $NH_3$ are totally cracked and sorbed at temperatures from 400° C. to 800° C. Carbon monoxide has also been observed to crack and sorb at 600° C. and presumably would at 400° C. as does $CO_2$. The useful operating range for the St 909 is from whatever temperature the impurity gas begins cracking up to the getter's melting point. Additional studies were conducted to evaluate the residence time effects at various getter temperatures for two methane concentrations. The results of these residence time studies are shown in FIGS. 3 and 4. Flow rates were varied from 100 to 5000 sccm to provide differing residence times from less than 0.5 seconds to more than 8 seconds for the methane on the heated getter. As shown in FIG. 3, residence times greater than 2 seconds are required for methane cracking efficiency of 100% at ≧700° C. and 0.1% $CH_4$ in helium. As shown in FIG. 4, at higher levels of methane, either higher temperatures or more residence time is required to achieve 100% cracking. For example, using 1.06% $CH_4$ in helium, a residence time of ≧2 seconds is sufficient to achieve cracking efficiency, but only at 800° C.

Several parameters may be adjusted to tailor the performance of the St 909 purifier to a particular process gas stream. The first parameter that can be adjusted is temperature. In the operating range studied (i.e., 400°–1000° C.) it was observed that higher temperatures provided more rapid cracking and sorption than did lower temperatures. However, in tritium applications, hydrogen isotope diffusion through the stainless steel purifier cartridge walls makes high temperature operation less desirable. In this case, the second parameter, residence time, could be increased to maintain high impurity removal efficiency. Residence time can be increased by either reducing the process gas flow rate or enlarging the St 909 purifier cartridge.

Figure 5:
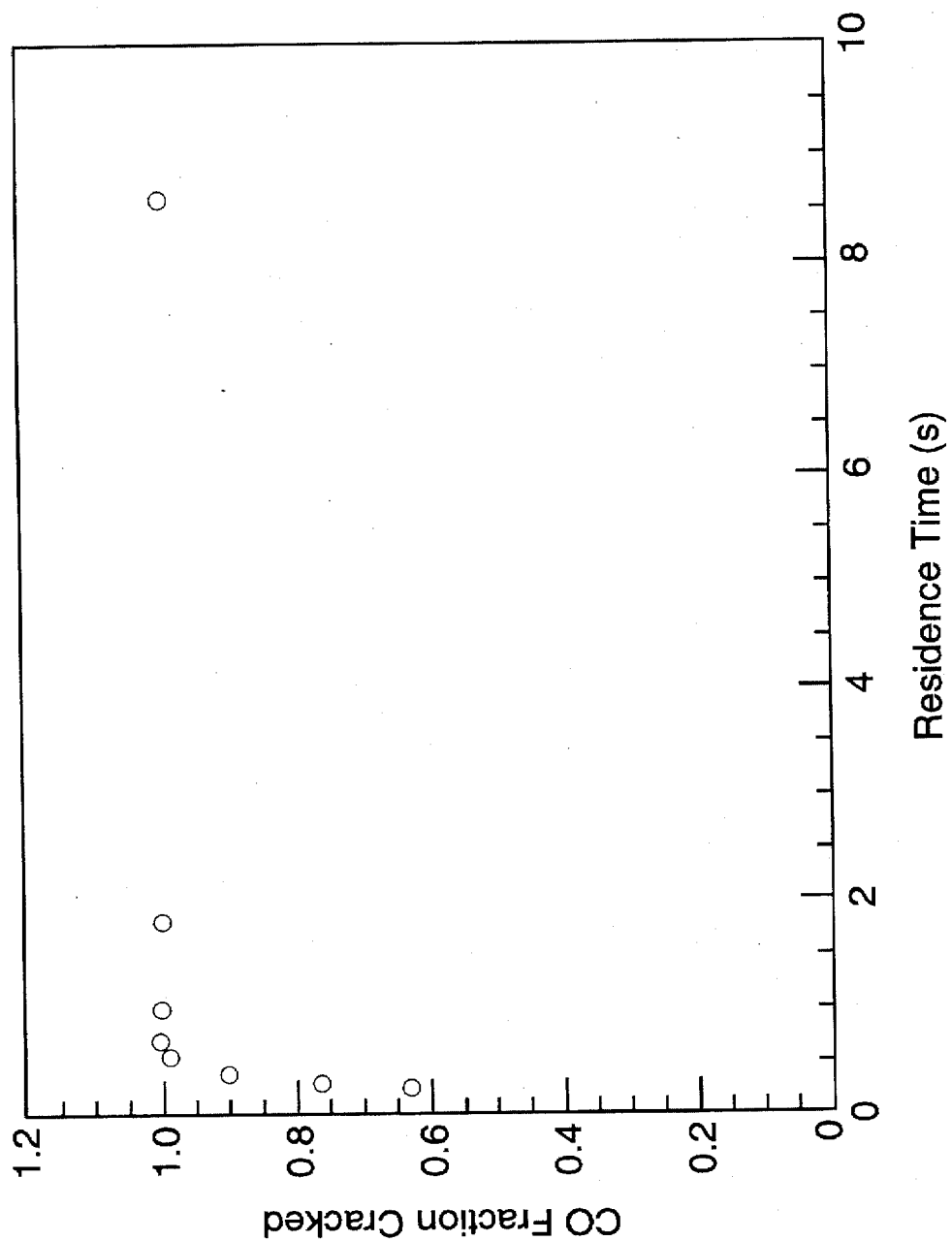
FIG. 5 is a graph showing the fraction of carbon monoxide cracked by the St 909 getter as a function of residence time in the getter casing.
Figure 6:
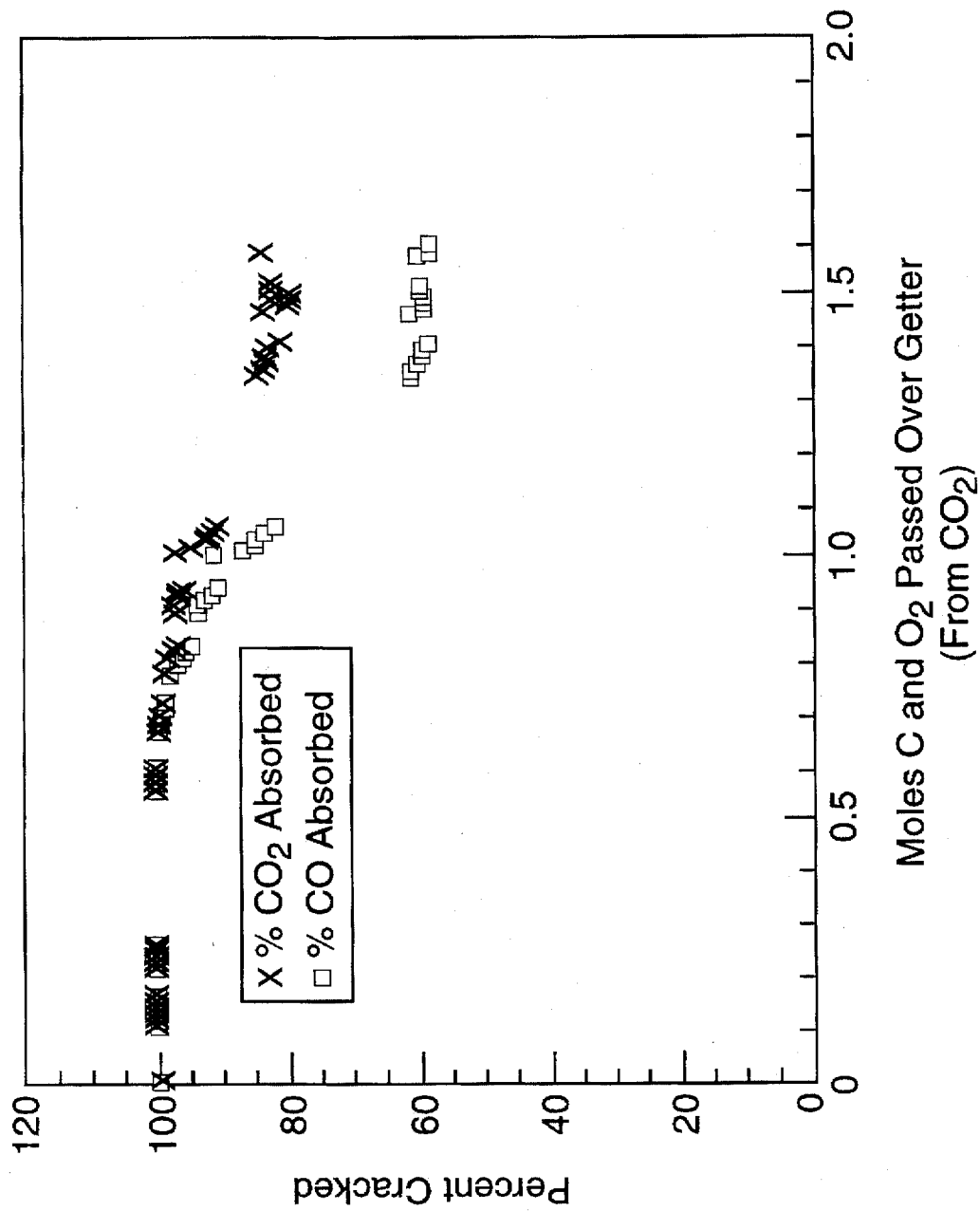
FIG. 6 is a graph showing the percentage of carbon monoxide and carbon dioxide cracked by the St 909 metal getters.

A similar residence time study was made using 0.1% carbon monoxide in argon at 600° C. The results of this test are shown in FIG. 5 where it can be seen that CO is more readily cracked than $CH_4$ by St 909 at 600° C. Although CO and $CO_2$ are easily cracked by this process, certain tritium recovery processes are expected to contain more of these impurity species than methane. Therefore, a loading experiment was conducted to establish how much $CO_2$ could be processed by St 909 and what effect loading had on cracking efficiency. The results of this study are presented in FIG. 6 which illustrates that essentially 100% of the $CO_2$ was cracked up to ~0.7 moles of elemental carbon and oxygen total loading. As the experiment continued, the gas analyzer began to detect small amounts of CO as well as $CO_2$ in the processed gas stream. By the time 1.5 moles of elemental carbon and oxygen from $CO_2$ had been loaded on the getter it was apparent that $CO_2$ is cracked in two steps. First, $CO_2$ is reduced to CO which is then further cracked to C and O which are retained by the getter. The capacity of the St 909 getter for $CO_2$ is quite high even at 600° C. Approximately 90% removal efficiency was maintained even after processing 1 mole of elemental carbon and oxygen from $CO_2$.

Figure 7:
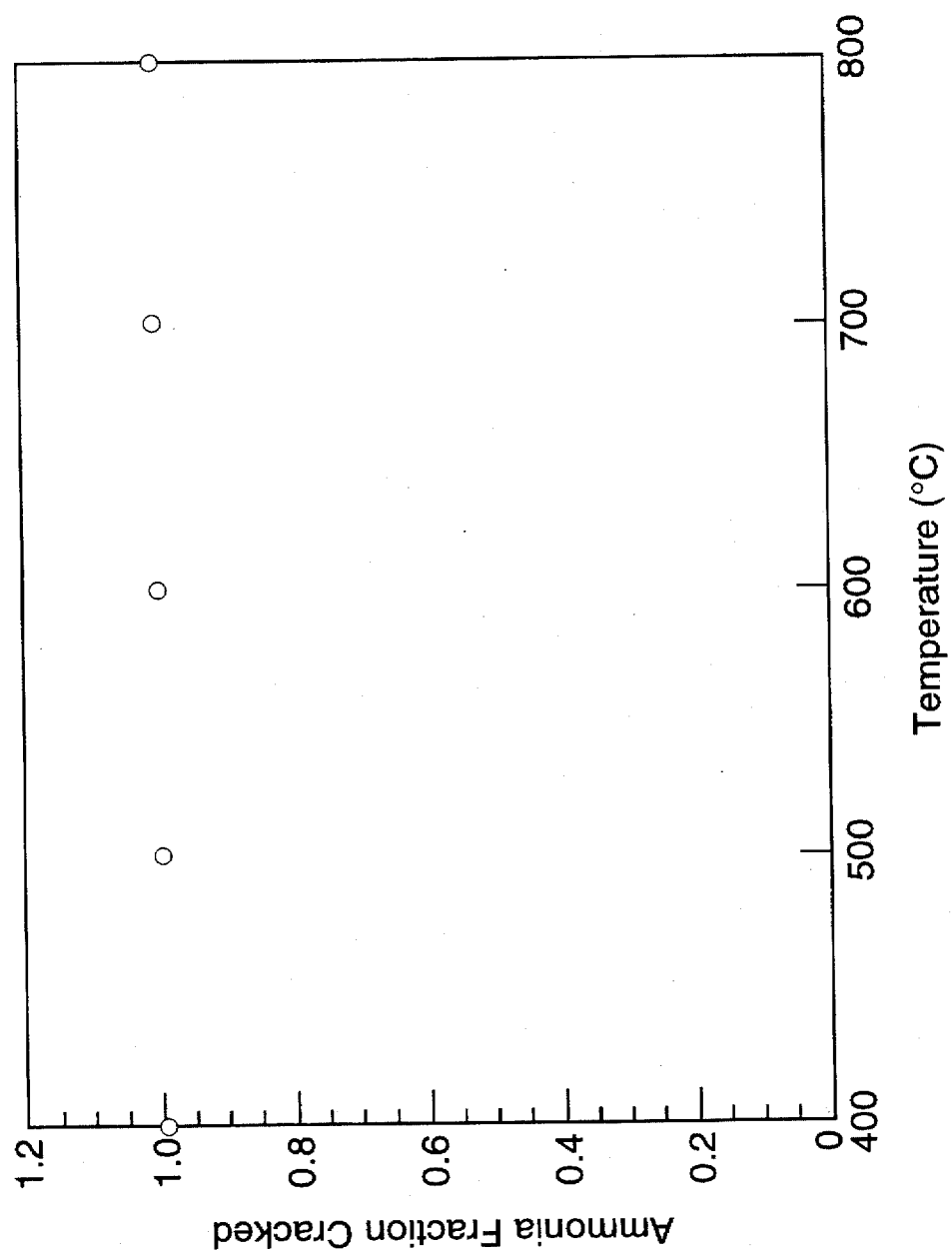
FIG. 7 is a graph illustrating the fraction of ammonia cracked by the St 909 metal getters at various getter temperatures.
Figure 8:
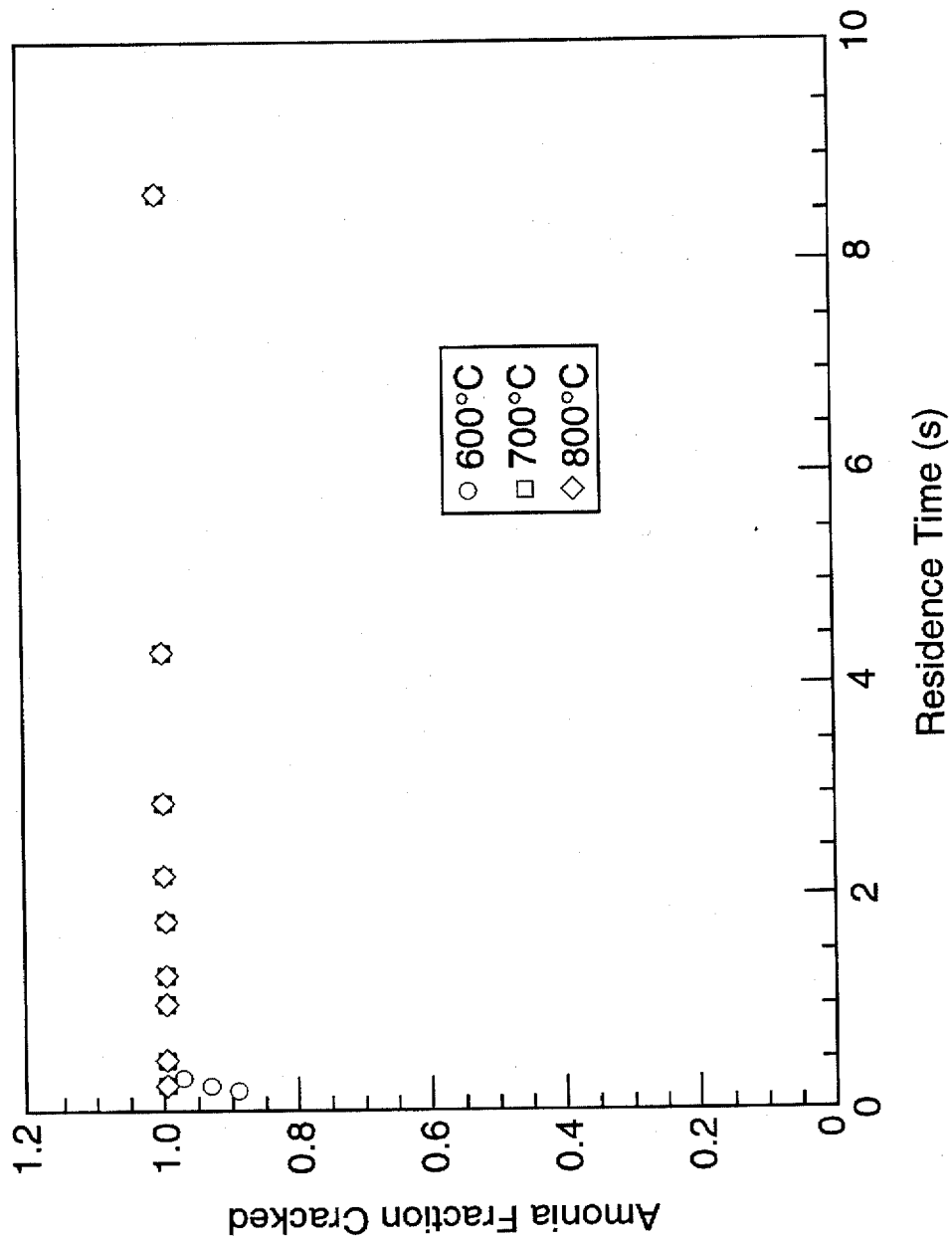
FIG. 8 is a graph showing the fraction of ammonia cracked by the St 909 getter at various getter temperatures and residence times.
Figure 9:
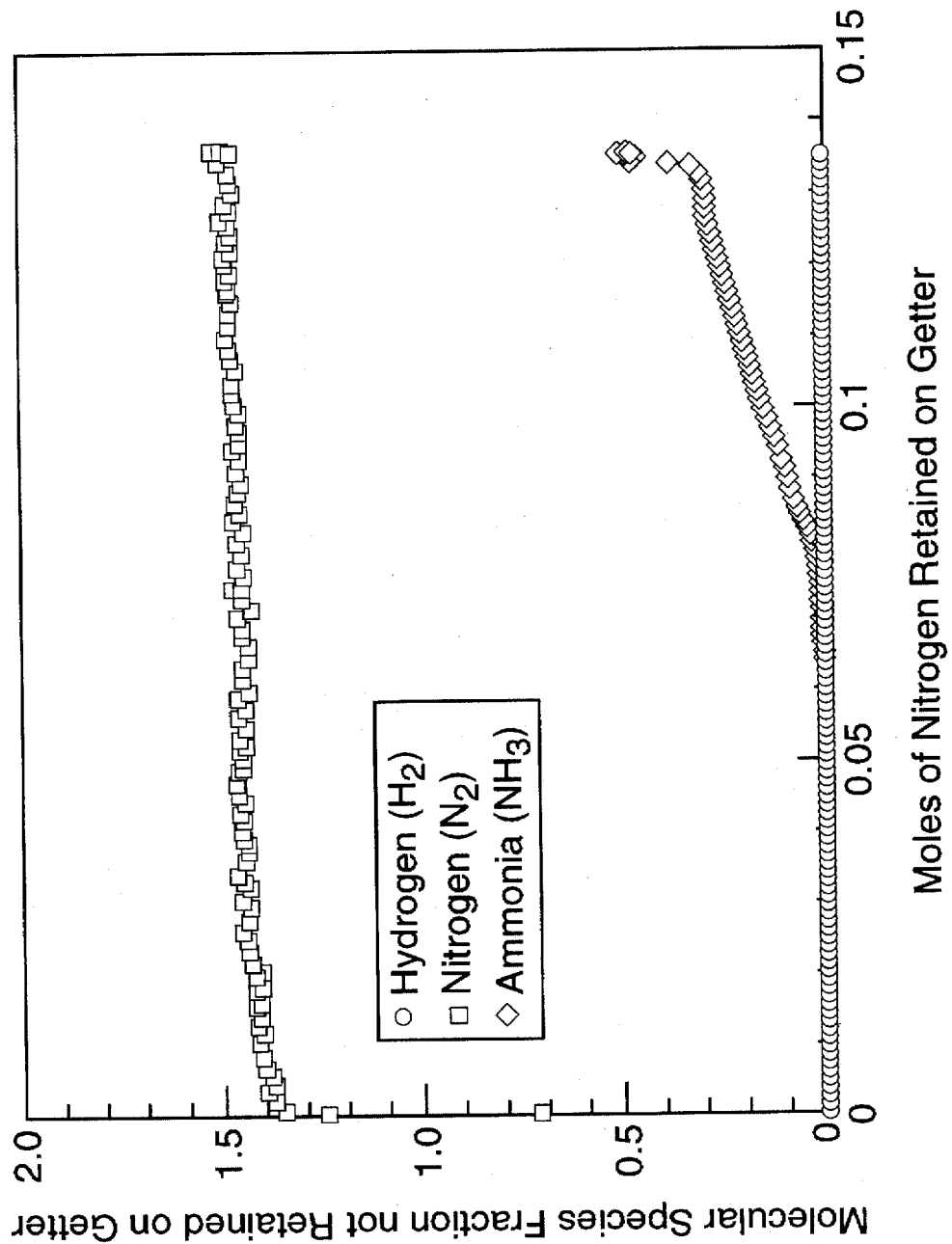
FIG. 9 is a graph showing the St 909 getter cracking efficiency of ammonia and the sorption of $N_2$ and $H_2$ versus getter loading.

Applicants also studied the behavior of nitrogen containing impurities by exposing the St 909 purifier to 1% $NH_3$ in helium. As shown in FIG. 7, ammonia is cracked by the St 909 getter with high efficiency at all temperatures studied. Various flow rates from 100 sccm to 5000 sccm were studied to determine the required residence time. The results of this study are given in FIG. 8. Ammonia is more easily cracked than methane such that residence times as short as 0.2 seconds are sufficient for complete cracking of ammonia when operating the St 909 purifier at ≧700° C. Hydrogen from the ammonia is rapidly released from the purifier and the nitrogen is sorbed by the getter. A loading study was made to determine the nitrogen capacity of this alloy at 800° C. FIG. 9 shows the cracking efficiency of ammonia and the sorption of $N_2$ and $H_2$ versus getter loading. The sorption capacity for $N_2$ is about ten times less than that observed for carbon and oxygen. Under these conditions the St 909 getter will sorb 0.05 moles of $N_2$ per 100 grams of alloy without loss of efficiency. The total capacity for $N_2$ is 0.13 moles per 100 gram of St 909 when operated at 800° C.

Figure 10:
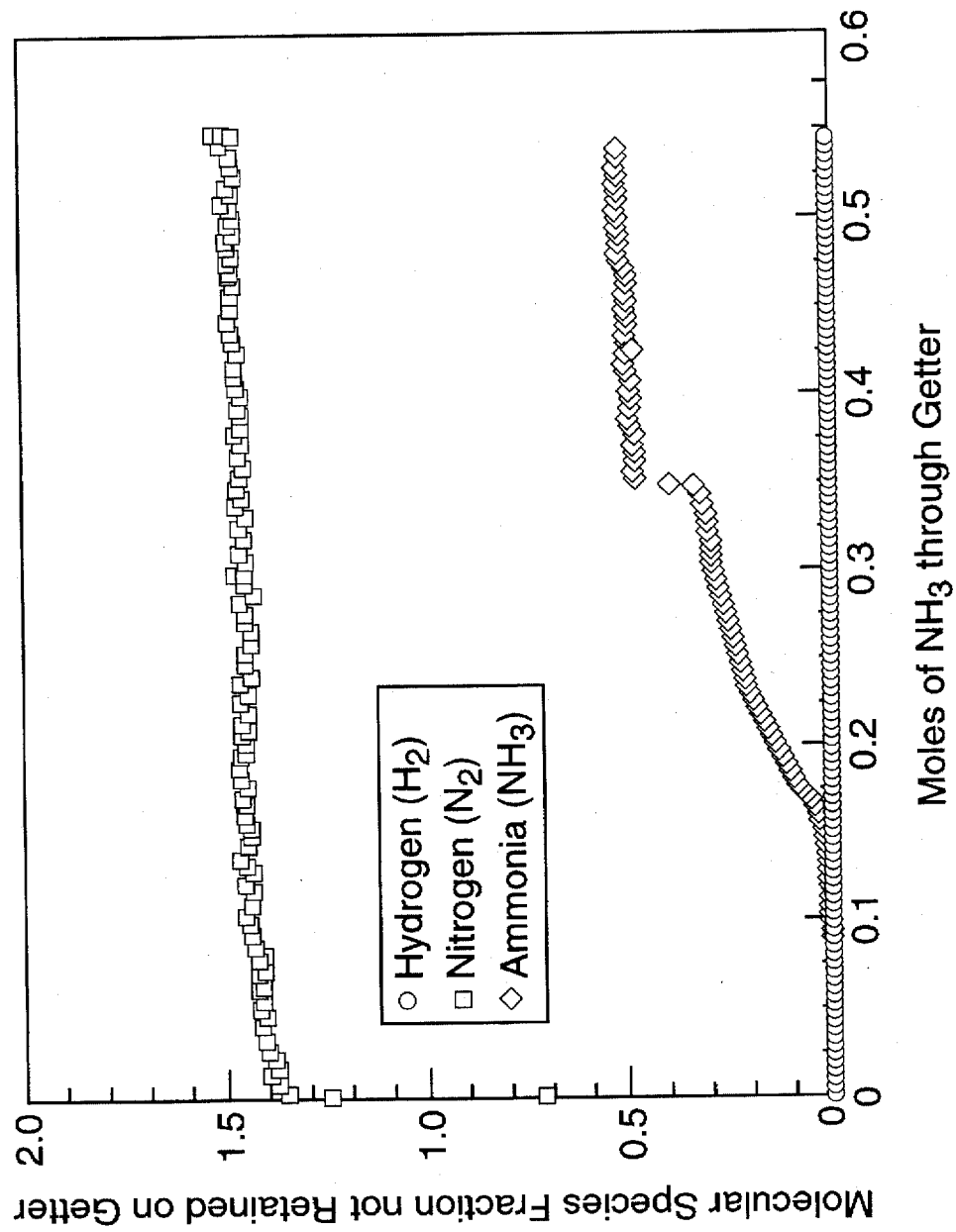
FIG. 10 is a graph showing the moles of ammonia passing through the St 909 getter versus the molecular species not retained on the getter.

FIG. 10 shows a plot of moles of $NH_3$ passed through the getter versus the molecular species not retained. This figure graphically demonstrates that even after the St 909 purifier has sorbed $N_2$ to capacity, $NH_3$ cracking continues at 100% efficiency. The effluent helium at this point contains all of the $N_2$ and $H_2$ from cracked $NH_3$. Behavior such as this suggests that St 909 may be a useful purifier in a nitrogen inerted system.

Figure 11:
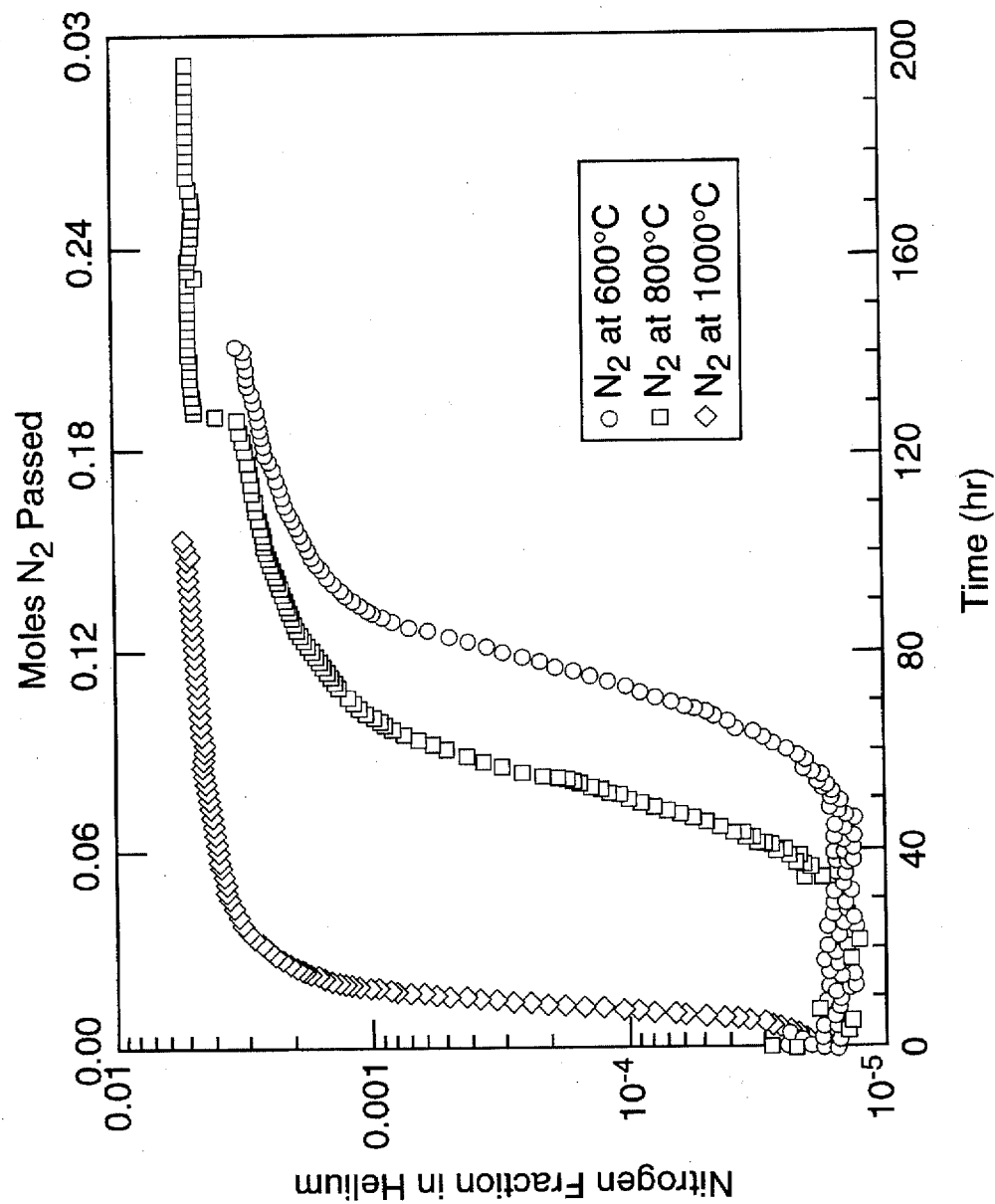
FIG. 11 is a graph showing the nitrogen loading of the St 909 metal getters over extended periods of time at various getter temperatures.

Another test was made to measure the nitrogen release from this alloy at various temperatures when exposed to ammonia for extended time periods. The results of these tests are shown in FIG. 11 where it can be seen that the lower the operating temperature of the purifier getter, the less nitrogen is sorbed. However, even at 1000° C., St 909 begins to lose efficiency after sorbing ~0.09 moles of $N_2$.

Figure 12:
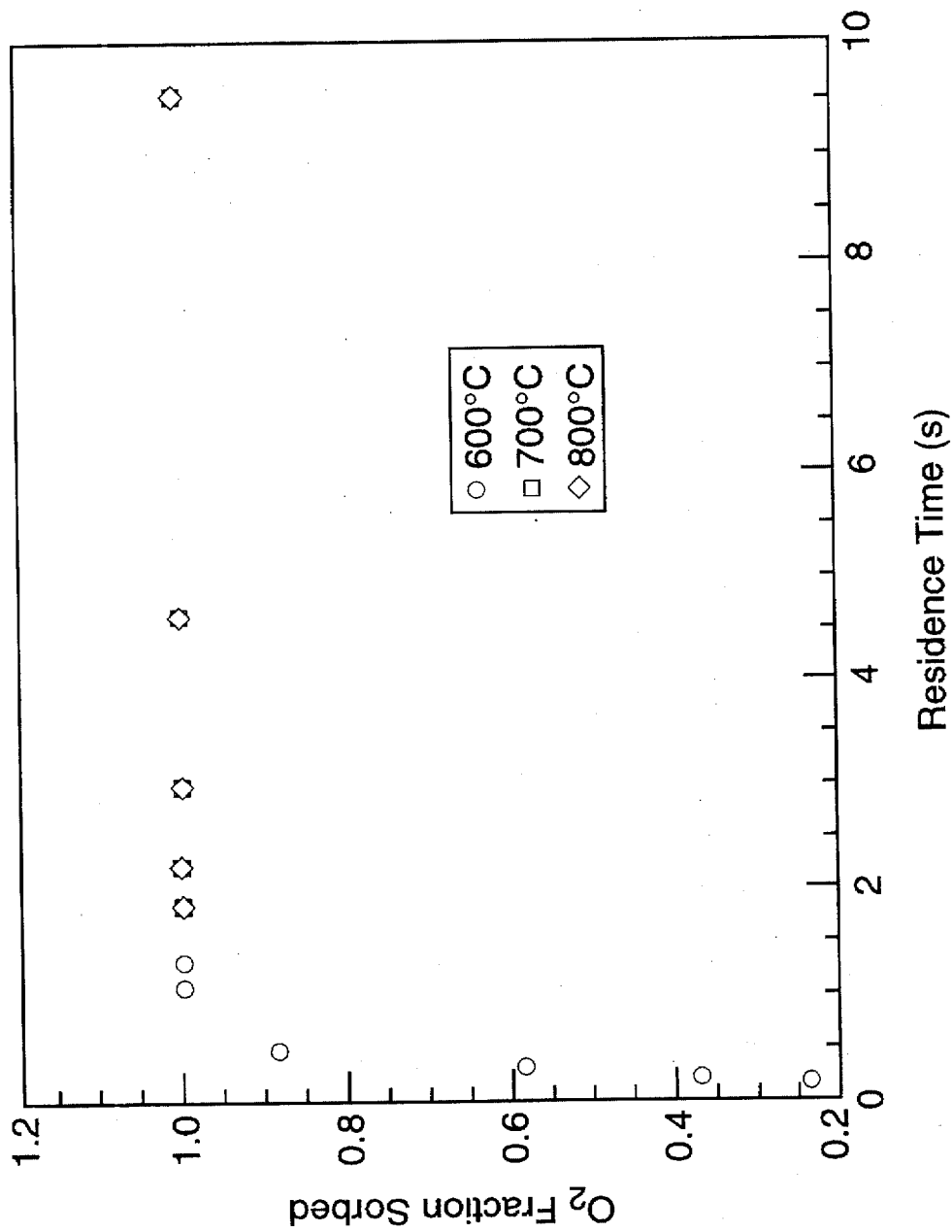
FIG. 12 is a graph showing the residence time versus getter temperature for oxygen removal by the St 909 getter.
Figure 13:
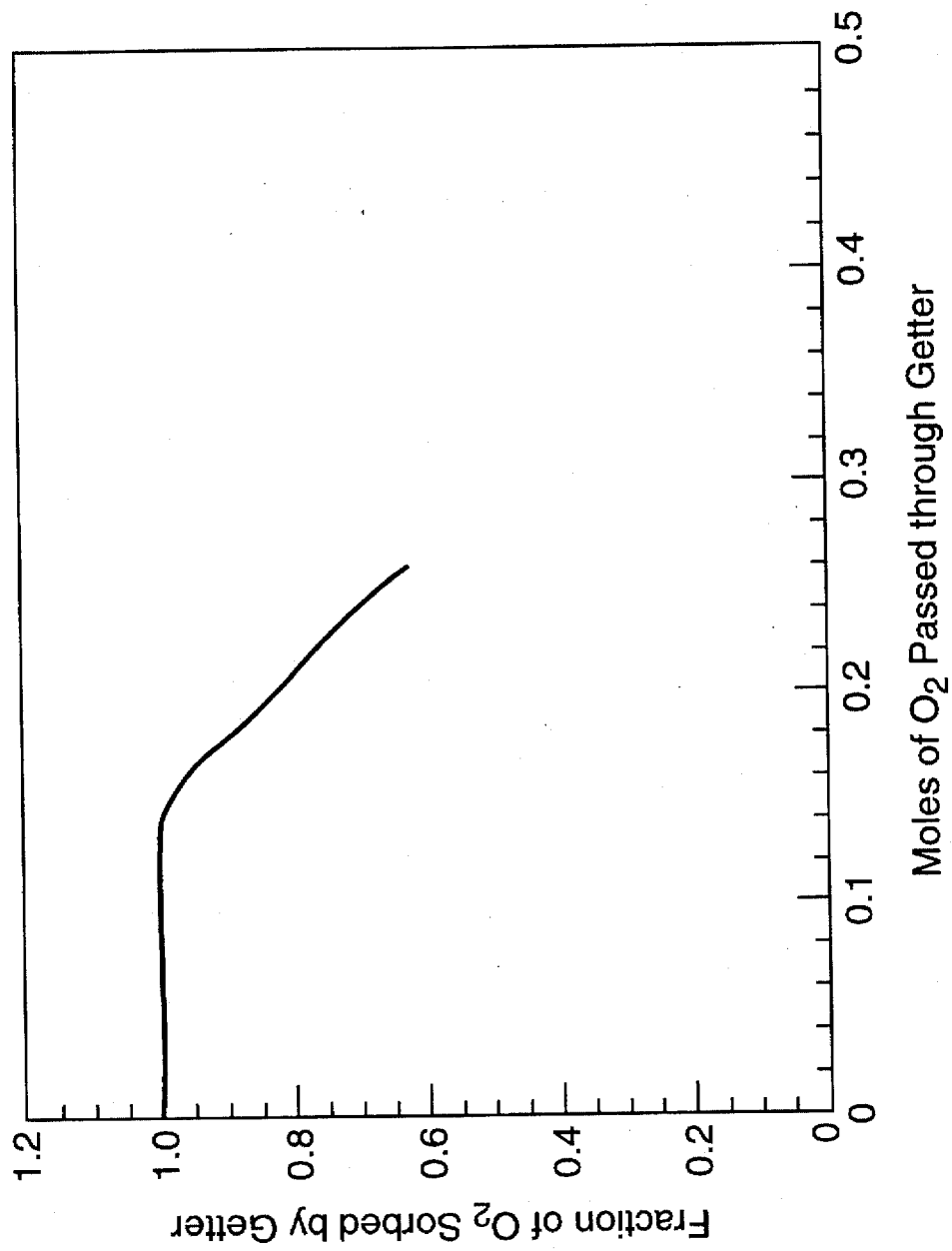
FIG. 13 is a graph showing the fraction of oxygen sorbed by the St 909 getter as a function of getter loading.

The removal of oxygen by the St 909 purifier was also studied. The same parameters were evaluated as previously described. At flow rates of 100 sccm, or less, through a 100 gram St 909 purifier, all of the 1% $O_2$ in helium is cracked and sorbed at 400° C. and higher. A plot of residence time versus temperature for oxygen removal is presented in FIG. 12. The residence time required for complete oxygen removal at 600° C. is one second. A loading study was conducted at 800° C. to determine the oxygen capacity of the purifier. The results, as shown in FIG. 13, indicate that 0.125 moles of oxygen as $O_2$ are sorbed per 100 grams of St 909 without loss of removal efficiency.

Additional experimental studies were conducted to determine the required temperature for cracking water vapor by the St 909 getter. The experimental parameters for these studies were the same as previously described. The results of these studies are given in the following Table 2:

TABLE 2

$H_2O$ Cracking versus Temperature, 0.6% $H_2O$ in Helium, 112 grams St 909, ~70 sccm

|  | 400° C. | 600° C. | 800° C. |
|---|---|---|---|
| $H_2O$ input level (torr) | 2.68E-7 | 2.68E-7 | 2.68E-7 |
| $H_2O$ output level (torr) | 5.87E-9 | 5.6E-9 | N.D.* |
| Measured % cracked | 98 | 98 | 100 |

*At or below detection limit

It is apparent from the data presented in Table 2 that substantially all water is cracked by the St 909 at temperatures in the range of 400°–800° C.

Figure 14:
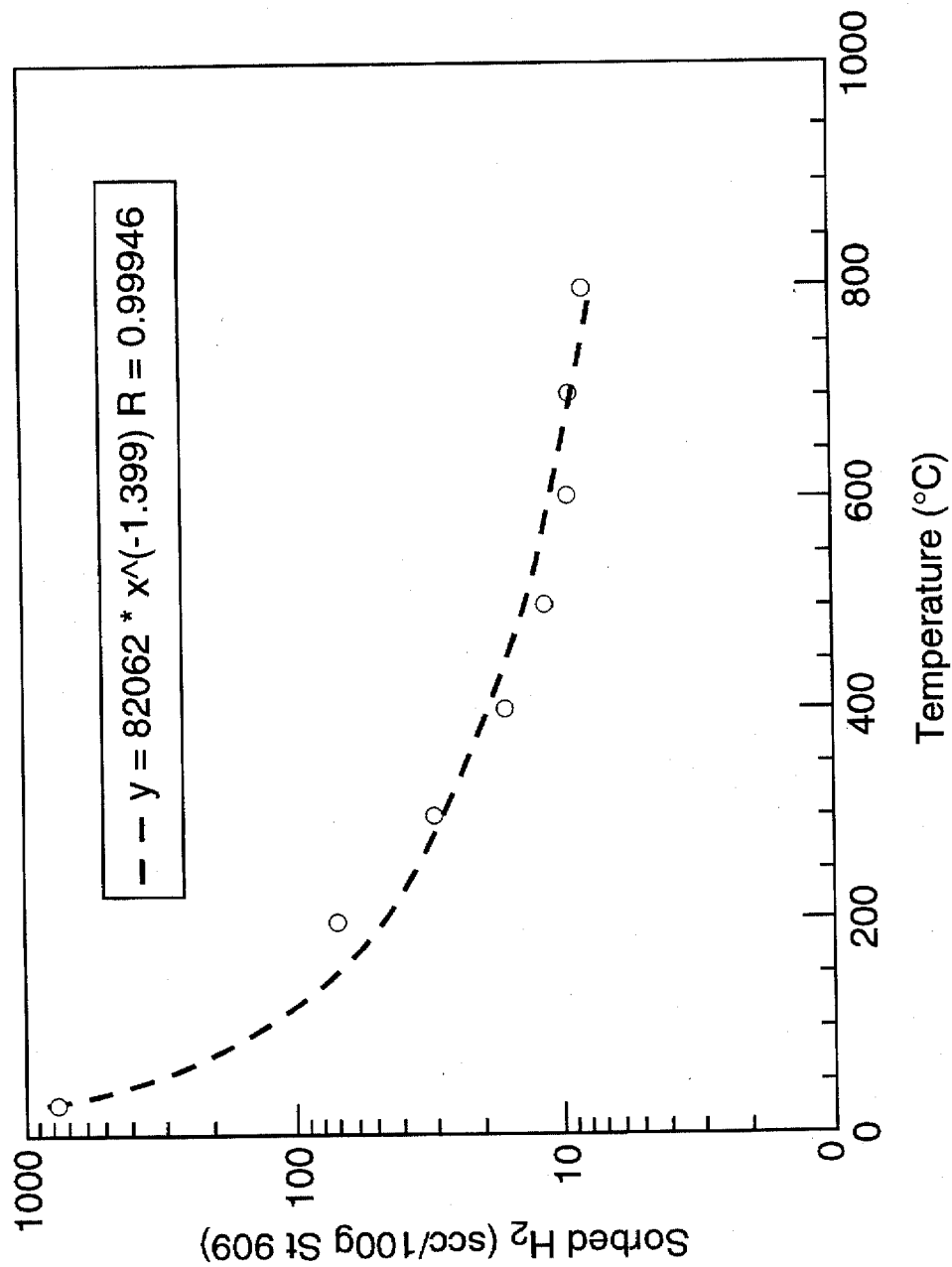
FIG. 14 is a graph showing the amount of hydrogen sorbed by the St 909 getter at various getter temperatures.

The St 909 alloy has the additional advantage of retaining little hydrogen (isotopes) at effective purifier operating temperature. For this reason, hydrogen sorption by St 909 was studied at various temperatures. A set of measurements using 0.5% $H_2$ in helium at 120 sccm to test a 100 gram St 909 cartridge at temperatures up to 800° C. is summarized in FIG. 14. Only about 10 sccm of $H_2$ per 100 grams of St 909 was sorbed in the temperature range of 400°–800° C. At lower temperatures, the amount of $H_2$ retained rises rapidly. However, even at room temperature, the amount of $H_2$ retained on the St 909 alloy is only approximately 5% of that held by St 707 under similar conditions.

Figure 15:
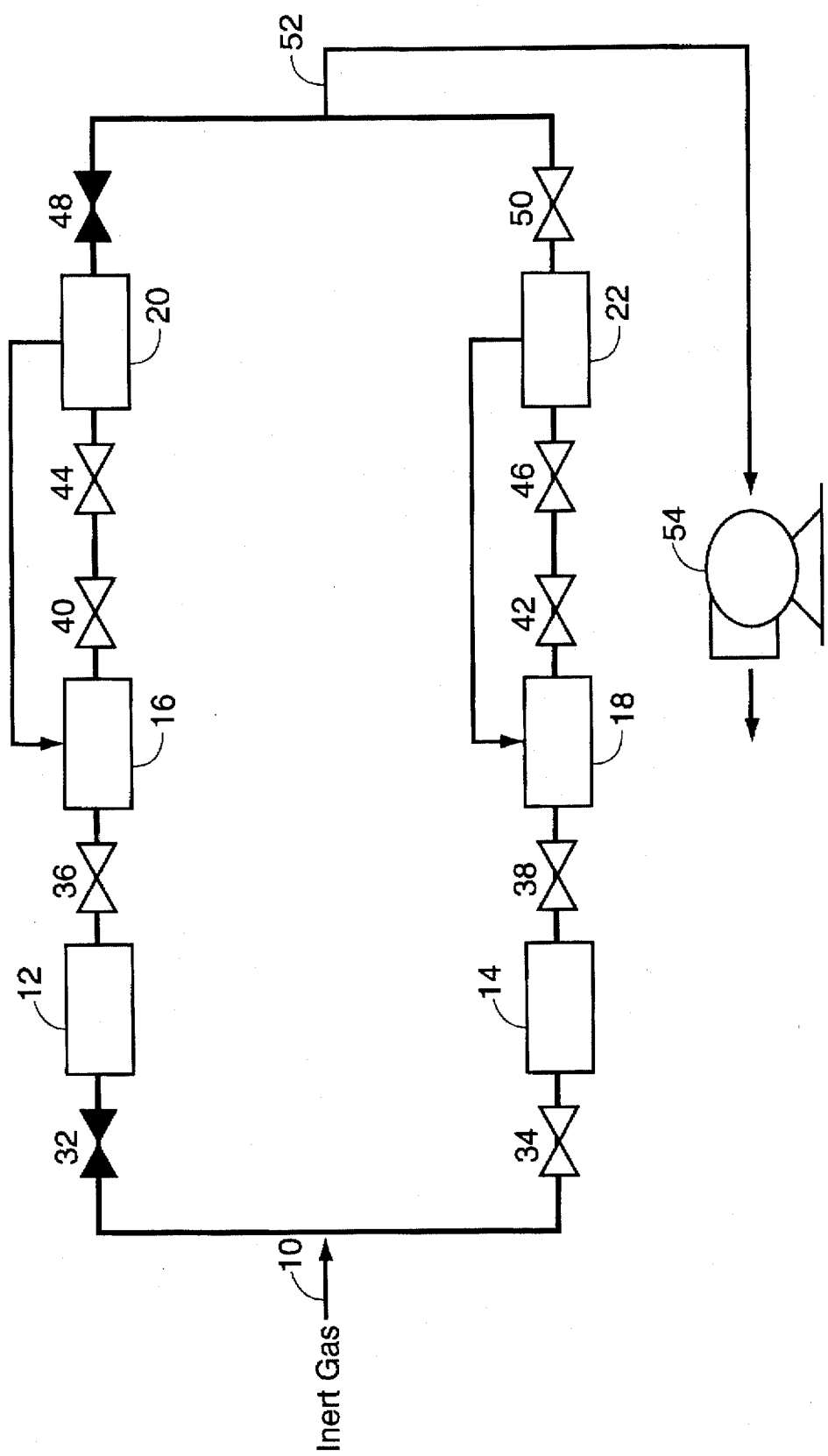
FIG. 15 is a schematic diagram showing a preferred embodiment of the present invention for the purification and collection of hydrogen isotopes from a gaseous stream.

By utilizing metal getters having the ability to remove impurities such as methane, ammonia, carbon monoxide, carbon dioxide, water, and oxygen, it is now possible to purify and collect hydrogen and its isotopes in a two step process rather than the conventional five step process previously described. A preferred embodiment of the present invention is shown in FIG. 15 which depicts parallel process lines. The gaseous mixture containing the impurities enters the system through gas line 10 and can be directed to either process line by opening or closing valves 32 and 34. Depending upon which process line is in operation the purification of the gaseous mixture takes place in housings 12 or 14, which preferably contain the metal alloy getters. As previously mentioned, preferably a metal alloy getter, such as St 909, is used for the purification of the gaseous mixture because of its capability to sorb the non-hydrogen impurities and is also its ability to not sorb the hydrogen isotopes. Many industrial processes rely on extremely pure gases such as helium or nitrogen and the purification of gas streams using metal alloy getters such as St 909 can be used to provide the high purity gases required. By controlling the getter temperature and the residence time of the gaseous mixture with the getters, high impurity removal efficiencies can be achieved.

In another embodiment of the invention, hydrogen isotopes can be collected from the remaining purified gaseous mixture using conventional hydrogen isotope collection means, such as metal alloy getters, including lanthanide-nickel and zirconium alloys, or uranium beds. Removal of impurities from the gaseous mixture prior to the hydrogen isotopic collection results in prolonging the collection getter efficiency and is otherwise more economical. As shown in FIG. 15 for the parallel processing lines, the collection step 16 and 18 is preceded by the purification step 12 and 14. Again valves 36 and 38 control the flow of the purified gaseous mixture between the purification and collection steps. In still another embodiment of the present invention, a secondary collection step 20 and 22 can be included in the process. This secondary collection step provides an additional benefit in allowing excessive loading of the primary collection getters and not permitting tritium to escape the system. Valves 40, 42, 44 and 46 are shown in FIG. 15 to isolate the primary and secondary collection steps. Upon loading, the primary collection getter can be taken off line and the secondary collection getter is then primary, in which case a new secondary collection getter can be brought on line. Valves 48 and 50 isolate each process line. After purification of the gas stream and collection of hydrogen isotopes, the remaining gas flows through line 52 and can be recycled into the process via pump 54 or used for an alternate purpose.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical application and enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A method for the purification of a gaseous mixture containing reactive impurities, comprising the steps of:
   (a) providing a bulk purifying getter in a casing, said purifying getter being comprised of a zirconium-manganese-iron-aluminum alloy having the capability of sorbing non-hydrogen reactive impurities and the capability of not sorbing hydrogen isotopes;
   (b) heating the bulk purifying getter;
   (c) introducing the gaseous mixture into the purifying getter casing for a sufficient residence time and at an effective temperature to cause the cracking and sorption of the non-hydrogen reactive impurities from the gaseous mixture by the purifying getter; and
   (d) removing the remaining non-sorbed gaseous mixture from the purifying getter casing.

2. The method of claim 1 wherein the amount of non-hydrogen reactive impurities contained within the gaseous mixture is in excess of 100 parts per million.

3. The method of claim 1 wherein the reactive impurities comprise between 0.01% to 1.1% of the gaseous mixture.

4. The method of claim 1 further comprising the step of collecting hydrogen isotopes from the remaining non-sorbed gaseous mixture.

5. The method of claim 4 wherein the hydrogen isotopes are collected from the remaining gaseous mixture by introducing at an effective getter temperature and residence time the remaining gaseous mixture into a second casing containing a collecting getter, said collecting getter having the capability of sorbing hydrogen isotopes.

6. The method of claim 5 wherein the collecting getter comprises a zirconium alloy.

7. The method of claim 5 wherein the collecting getter comprises a lanthanide-nickel alloy.

8. The method of claim 5 wherein the collecting getter is comprised of uranium.

9. The method of claim 1 wherein the purifying getter alloy contains in percent by weight approximately, 40% zirconium, 25% manganese, 25% iron, and 10% aluminum.

10. The method of claim 1 wherein the gaseous mixture to be purified is substantially hydrogen isotopes.

11. The method of claim 1 wherein the gaseous mixture to be purified is substantially a noble gas.

12. The method of claim 1 wherein the gaseous mixture to be purified is substantially nitrogen.

13. The method of claim 1 wherein the reactive impurities are selected from the group comprised of $C_xQ_y$, $CQ_4$, CO, $CO_2$, $N_2$, $O_2$, or $NQ_3$, where x and y are integers, and Q is a hydrogen isotope.

14. The method of claim 1 wherein the temperature of the purifying getter is in the range of between 400° C. and 1000° C.

15. A method for the purification of a gaseous stream of non-hydrogen reactive impurities and collection of hydrogen isotopes from the purified gaseous stream comprising the steps of:
   (a) providing a bulk purifying getter in a casing, said purifying getter being comprised of a zirconium-manganese-iron-aluminum alloy having the capability of sorbing non-hydrogen reactive impurities and the capability of not sorbing hydrogen isotopes;
   (b) introducing the gaseous mixture into the purifying getter casing for a sufficient residence time and at an effective temperature to cause the cracking and sorption of the non-hydrogen reactive impurities from the gaseous mixture by the purifying getter;
   (c) removing the remaining non-sorbed gaseous mixture from the purifying getter casing;
   (d) providing a bulk collection getter in a casing, said collection getter being comprised of an alloy having the capability of sorbing hydrogen isotopes;
   (e) introducing the non-sorbed gaseous mixture removed from the purifying getter casing into the collection getter casing for a sufficient residence time and at an effective getter temperature to cause the bulk collection getter to sorb hydrogen isotopes from the gaseous mixture;
   (f) removing the non-sorbed gaseous mixture from the collection getter casing.

16. The method of claim 15 wherein the purifying getter alloy contains in percent by weight approximately, 40% zirconium, 25% manganese, 25% iron, and 10% aluminum.

17. The method of claim 16 wherein the reactive impurities comprise between 0.01% to 1.1% of the gaseous mixture.

18. The method of claim 15 wherein the reactive impurities are selected from the group comprised of $C_xQ_y$, $CQ_4$, CO, $CO_2$, $N_2$, $O_2$, or $NQ_3$, where x and y are integers, and Q is a hydrogen isotope.

19. The method of claim 18 wherein the temperature of the purifying getter is in the range of between 400° C. and 1000° C.

20. The method of claim 15 wherein the amount of non-hydrogen reactive impurities contained within the gaseous mixture is in excess of 100 parts per million.

21. An apparatus for the purification of hydrogen isotopes from a gaseous mixture containing reactive impurities, comprising:
   (a) control means for controlling the flow of the gaseous mixture, said mixture being directed through a housing;
   (b) purification getter means within the housing for removing through cracking and sorption substantially all non-hydrogen reactive impurities from the gaseous mixture, the purification getter means being comprised of a zirconium-manganese-iron-aluminum alloy, the remaining gaseous mixture then exiting the housing and being comprised substantially of hydrogen isotopes and other non-sorbed gases; and
   (c) temperature control means for controlling the purification getter temperature.

22. The apparatus of claim 21 further comprising primary collection means for collecting hydrogen isotopes from the remaining gaseous mixture exiting the housing.

23. The apparatus of claim 22 further comprising secondary collection means for collecting hydrogen isotopes not previously collected by the primary collection means.

24. The apparatus of claim 23 wherein the primary collection and secondary collection means are zirconium alloys.

25. The apparatus of claim 23 wherein the primary collection and secondary collection means are lanthanide-nickel alloys.

26. The apparatus of claim 23 wherein the primary collection and secondary collection means is uranium.

27. The apparatus of claim 21 wherein the purification getter means is a zirconium-manganese-iron-aluminum alloy having the capability of sorbing non-hydrogen reactive impurities and the capability of not sorbing hydrogen isotopic impurities.

28. The apparatus of claim 22 wherein the reactive impurities cracked and sorbed by the purification getter means are selected from the group comprised of $C_xQ_y$, $CQ_4$, CO, $CO_2$, $N_2$, $O_2$, $NQ_3$, or $Q_2O$, where x and y are integers, and Q is a hydrogen isotope.

29. A system for the continuous purification and collection of hydrogen isotopes from a gaseous mixture containing reactive impurities, comprising
   (a) valve means for controlling the flow of the gaseous mixture between a plurality of parallel process lines;
   (b) a purification getter material within each process line, said getter material being comprised of a zirconium-manganese-iron-aluminum alloy having the capability, when contacted with the gaseous material for a sufficient residence time and at an effective temperature, of sorbing non-hydrogen reactive impurities from the gaseous mixture and having the further capability of not sorbing hydrogen isotopes; and
   (c) primary collection getter means, within each process line in downstream communication with said purification getter material, for collecting hydrogen isotopes from the gaseous mixture.

30. The apparatus of claim 29 wherein the purification getter material is a zirconium-manganese-iron-aluminum alloy comprising, in percent by weight, approximately 40% zirconium, 25% manganese, 25% iron and 10% aluminum.

31. The apparatus of claim 29 further comprising secondary collection means, in downstream communication with said primary collection means, for collecting hydrogen isotopes not previously collected by the primary collection means.

32. The apparatus of claim 31 wherein the primary collection and secondary collection means are zirconium alloys.

33. The apparatus of claim 29 wherein the reactive impurities sorbed by the purification getter material are selected from the group comprised of $C_xQ_y$, $CQ_4$, CO, $CO_2$, $N_2$, $O_2$, $NQ_3$, or $Q_2O$, where x and y are integers, and Q is a hydrogen isotope.

34. The apparatus of claim 29 wherein the gaseous mixture contains a concentration of the reactive impurities in excess of 100 parts per million.

35. The apparatus of claim 29 wherein the reactive impurities comprise between 0.01% to 1.1% of the gaseous mixture.

* * * * *